United States Patent [19]
Winser

[11] Patent Number: 5,394,516
[45] Date of Patent: Feb. 28, 1995

[54] GENERATING AN IMAGE

[75] Inventor: Paul A. Winser, Redhill, England

[73] Assignee: U.S. Philips Corporation, New York, N.Y.

[21] Appl. No.: 724,576

[22] Filed: Jun. 28, 1991

[30] Foreign Application Priority Data

Jun. 29, 1990 [GB] United Kingdom ............... 9014555
Jan. 9, 1991 [GB] United Kingdom ............... 9100452

[51] Int. Cl.$^6$ ........................................... G06F 15/62
[52] U.S. Cl. ................................. 395/119; 395/128; 395/132
[58] Field of Search ............... 395/118, 119, 125–132; 358/140

[56] References Cited

U.S. PATENT DOCUMENTS

| | | | |
|---|---|---|---|
| 5,019,903 | 5/1991 | Dougall et al. | 358/140 |
| 5,025,400 | 6/1991 | Cook et al. | 395/128 X |
| 5,287,438 | 2/1994 | Kelleher | 395/132 |

FOREIGN PATENT DOCUMENTS 2177577A 1/1987 United Kingdom .......... G09G 1/16

OTHER PUBLICATIONS

W. Strasser, "A VLSI Oriented Architecture for Parallel Processing Image Generation" Proceedings of the IFIP EG 10.3 Working Conference on Highly Parallel Computers for Num. and Sign. Proc. App. Mar. 1986, pp. 247–258.

"Fast Spheres, Shadows, Textures, Transparencies and Image Enhancements in Pixel–Planes"; Fuchs et al; Computer Graphics, vol. 19, No. 3 pp. 111–120 (1985).

"A Hidden–Surface Algorithm with Anti–Aliasing"; E. Catmull, Computer Graphics vol. 12, No. 3, pp. 6–11. (1978).

"The A–Buffer, An Antialiased Hidden Surface Method", L. Carpenter, Computer Graphics, vol. 18, No. 3, pp. 103–108. (1984).

"A Survey of Texture Mapping", Heckbert; IEEE Computer Graphics and Applications, Nov. 1986 pp. 56–67.

Primary Examiner—Almis Jankus
Attorney, Agent, or Firm—Jack D. Slobod

[57] ABSTRACT

An image of objects in a three dimensional space is generated for display on a two dimensional regular pixel array by offset and span generations (OFGN, SPGN) for anti-alias filtering which causes multiple rendition of the image, with each rendition displaced by a sub-pixel offset (Nx,Ny) with respect to the previous rendition. Image primitives are rendered by a scan line algorithm using a linked active polygon list (APL) and a deleted polygon list (DPL) to enable vertical offsets to be effected. The deleted polygon list stores primitives which would not be effective for a given line but for the offset to enable anti-alias filtering. These polygons would not normally be available for processing when using the scan line algorithm. Economical hardware (600) is provided for horizontal edge correction of parameters such as depth (z) and texture coordinates (u,v).

13 Claims, 5 Drawing Sheets

GENERATING AN IMAGE

RELATED APPLICATION

This application is related in subject matter to a commonly-owned application, entitled "Method of and Apparatus for Generating an Image", inventor —Jeremy S. Morris, which is filed concurrently with this application. This related application is incorporated herein by reference.

BACKGROUND OF THE INVENTION

The invention relates to apparatus for generating an image of objects in a three dimensional space for display as a two dimensional regular pixel array comprising a series of rows of picture elements (pixels), comprising:
   means for generating and storing a plurality of primitive descriptors, each comprising a geometrical and surface description of a primitive of the desired image,
   means for using the stored primitive descriptors to render a plurality of point sampled intermediate pixel arrays,
   means for imposing for each such rendition a different pre-determined offset between the primitives and the sample points, and
   means for combining the plurality of intermediate pixel arrays to generate and store a corresponding filtered pixel array.

An apparatus of the type set forth in the opening paragraph is known from 'Fast Spheres, Shadows, Textures, Transparencies and Image Enhancements in Pixel Planes' by Henry Fuchs et al in Computer Graphics, Vol. 19, No. 3 (SIGGRAPH 85) at pages 111–120, in particular at pages p. 119 and 120 under 'Successive Refinement'. According to Fuchs, "Each pixel (xy) is sub-divided into a grid of sub-pixels so that each sub-pixel has an address of the form (x+xoffset, y+yoffset). We generate the image several times, for example 16, each time offsetting the image slightly by some (xoffset, yoffset) in such a way that the sample points within a pixels area form a reasonable distribution. (The shift is easily achieved by adding A.xoffset+B.yoffset to the C.coefficient of each broadcast triple.) Two sets of colour buffers are maintained, one to store the colour generated by the latest image generation offset and the other to store a running average as we move around the sub-pixel grid."

The primary aim of the filtering applied by this method is to reduce aliasing artefacts caused by the sampling process. One obtrusive artefact of aliasing is the staircase structure imposed on an edge of a primitive which slopes relative to the pixel array axes. This effect becomes particularly obtrusive in the case where the edge of the primitive is nearly aligned with an axis of the pixel array.

Unfortunately, while it is desirable to bring such high-performance (real-time) image synthesis to the consumer marketplace, the cost of the 'pixel planes' hardware and further the large memory required for two full-frame colour buffers makes the Fuchs method too expensive for application in consumer hardware.

A class of rendering algorithms known as scanline algorithms are also known, for example from E. Catmull, "A Hidden-surface Algorithm with Anti-aliasing", Computer Graphics Vol. 12, No. 3, 6–11 (SIGGRAPH 1978) and L. Carpenter, "The A-buffer, an Antialiased Hidden Surface Method", Computer Graphics Vol. 18, No. 3, 103–108 (SIGGRAPH 1984). In scanline algorithms, the image is generated one pixel row at a time. However, the antialiasing algorithms which are described by Catmull and Carpenter are undesirably complex for implementation in hardware, especially consumer hardware.

SUMMARY OF THE INVENTION

It is an object of the invention to enable the synthesis of realistic antialiased images at or near real-time speed in a hardware system of reduced cost and complexity compared with the known systems.

The invention provides an apparatus as set forth in the opening paragraph, characterized in that the intermediate pixel arrays are one dimensional arrays, generated and combined for a first one of the pixel rows and then sequentially for a series of new pixel rows in turn until the image is complete.

By generating the intermediate pixel arrays one row (or scan line) at a time, it is possible to implement the hardware with smaller, faster memories in the pixel processing stage. Only one full-frame colour buffer is required, resulting in a considerable saving. At the same time complex analytical filtering algorithms are avoided by the use of simple point sampled rendering, with consequently much simpler hardware.

The apparatus may further comprise means for identifying a subset of the primitives as being active for each new pixel row in the series. The rendering means can thus be arranged to ignore the descriptors of primitives not in the active subset, to save wasted processing effort.

A problem arises in the maintenance of the active polygon information, in that the different sub-pixel offsets applied between the renditions can cause different primitives to be active for each rendition, if the offset takes a sample point just over the edge of a primitive.

Accordingly, the apparatus may further comprise means identifying a further subset of the primitives as being potentially active in the new row depending on the said offset. The rendering means can then treat as active primitives in the further subset selectively in response to each offset.

Identifying further primitives which are potentially active on a given scan line depending on the magnitude of any particular offset enables a scan line algorithm to be presented with the necessary information in the column direction which is not normally available to it but which is required to enable anti-alias filtering by multiple rendition.

The apparatus may include means for generating and storing start row data identifying, for each primitive, the first pixel row in the series for which the primitive is active and means for maintaining a list of active primitives and updating the said list by using the start row data to identify and add to the list any primitive first active in each new pixel row. The start row data may comprise a list identifying for each pixel row any primitive first active in that row.

The apparatus may further comprise means for generating and storing end row data identifying for each primitive the last pixel row in the series for which the primitive is active and means for deleting a primitive from the active primitive list when the plurality of intermediate pixel arrays for the identified last row have been rendered. The apparatus may comprise means for maintaining a deleted primitive list, identifying primitives deleted from the active primitive list which may yet be required to be treated as active in response to one or more of said offsets.

Alternatively, the apparatus could identify further primitives which are potentially active on a given scan line by deleting the primitives from the active primitive list one row later than the row on which they actually end. In such an apparatus the requirement of maintaining a deleted primitive list is replaced by extending the checks performed on each span to see whether or not it should be rejected.

Each primitive descriptor may include a pointer field for a pointer to a further primitive descriptor and the active primitive list may be formed for each row by using a succession of such pointers to link the active primitives together in a chain. The same pointer field may be used as part of the start row data to link together in the chain two or more primitives which are first active in the same pixel row. The same pointer field may be used to link together in a chain the further subset of primitives.

In addition to its geometric description, each primitive descriptor, and consequently each span descriptor, may also describe the variation of one or more further parameters over the primitive's surface. Such parameters include depth (z), texture coordinates and other parameters relating to lighting effects. For optimum image quality such parameters require not only vertical offset correction but also horizontal edge correction or (sometimes called "row start correction"), which compensates for the truncation of the horizontal start position to an integer pixel position.

Accordingly, in an embodiment wherein the rendering means includes span generating means for receiving a primitive descriptor and for generating therefrom a sequence of span descriptors each defining the extent of a primitive on a corresponding pixel row, the span generating means may include:

means for calculating with sub-pixel precision a horizontal start position for the span;
  means for calculating a start value for at least one further parameter;
  means for receiving with sub-pixel precision a vertical offset value, for calculating therefrom a vertical offset correction for the horizontal start position and for modifying the horizontal start position in accordance with the vertical offset correction;
  means for calculating for the or each further parameter start value (i) a correction due to the received vertical offset and (ii) a correction due to the sub-pixel part of the modified horizontal start position to compensate for truncation of the horizontal start position to an integer pixel position, and for modifying the or each further parameter start value in accordance with those corrections.

Certain values calculated for vertical offset correction of the horizontal start position may be useful also in the calculation of the corrections for the further parameter value(s). Accordingly, in one embodiment of the apparatus, the horizontal start position for the span is modified before modification of the further parameter start value(s), the fractional part of the modified horizontal start position being stored temporarily for use in calculating the correction to be applied to the parameter start value.

Further refinements are set forth in the following description and the dependent claims. In particular the calculations of corrections for vertical offset correction and horizontal edge correction can be made similar in form and by suitable sequencing of operations certain components which are expensive in terms of chip area can be used sequentially for more than one of these calculations.

BRIEF DESCRIPTIONS OF THE DRAWINGS

Embodiments of the invention, from which the above and other features and advantages of the invention will become apparent, will now be described, by way of example, with reference to the accompanying drawings in which:

FIG. 1 shows in block schematic form apparatus for generating an image of objects in a three dimensional space for display on a two dimensional pixel array suitable for performing anti-alias filtering by multiple rendition, FIG. 2 illustrates the principle of anti-alias filtering by multiple rendition, FIG. 3 shows in block schematic form an embodiment of apparatus according to the invention for generating an image of objects in a three dimensional space for display on a two dimensional pixel array.

FIG. 4 illustrates the principle of anti-alias filtering by multiple rendition in the apparatus of FIG. 3, FIGS. 5 and 6 show memory organisation within the apparatus shown in FIG. 3, and FIG. 7 shows in block schematic form part of a span generator in an apparatus according to the present invention.

DETAILED DESCRIPTION OF THE PREFERRED EMBODIMENTS

Figure 1:
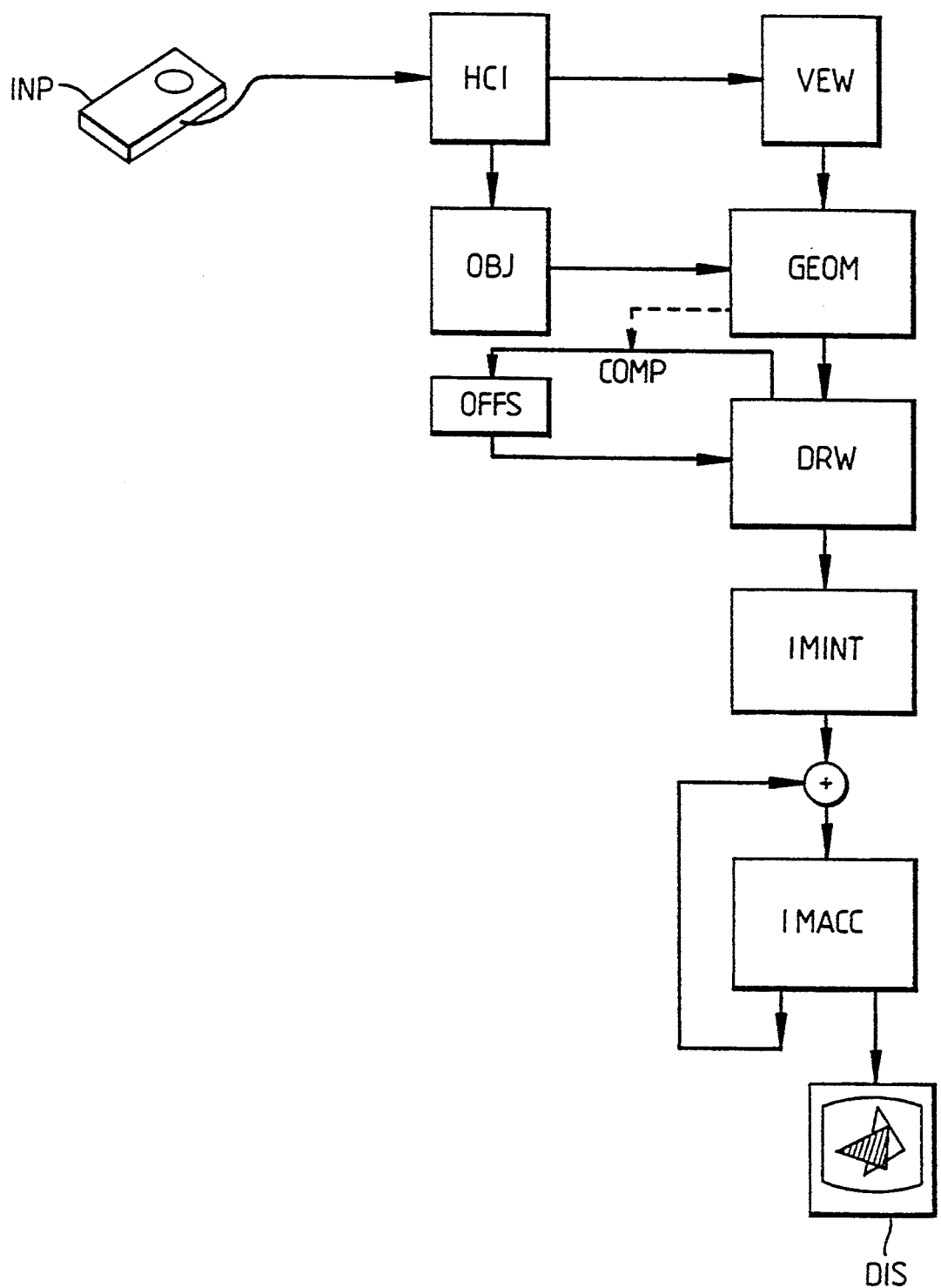

FIG. 1 shows schematically an apparatus for the display of images on a two dimensional display representing three dimensional objects. A data base module (OBJ) stores and manages a data base forming a model of a three dimensional environment, "the object space", containing various three dimensional objects, each modelled as a group of object primitives. Each primitive may, for example, be a polygonal surface or a curved patch which in turn is defined by a geometric description, for example vertex coordinates, and a surface description such as colour, texture, transparency, surface normal, etc. Geometric and surface descriptions of light sources may also be included. Another module (VEW) defines a viewing space, for example in terms of the position of a view-point, the direction of view and the field of view.

User input means (INP), such as a track ball, mouse and/or keyboard, are connected to a human computer interface module (HCI) which allows a user to manipulate or modify objects within the object space or to manipulate the view point, direction of view and other attributes of the viewing space. A geometry module (GEOM) performs geometric transformations to translate the various object space geometric descriptions of primitives defined in the data base module (OBJ) to equivalent descriptions in the viewing space. These transformations will generally include translation, rotation and perspective as is well known in the art. The surface descriptions of the primitives are also defined in accordance with lighting conditions in the viewing space. In the normal case where the image is only two dimensional, coordinates in the viewing space in 2-dimensions, typically called x and y, will correspond linearly to the screen coordinates, while a third coordinate z corresponds to the depth of the object into the screen.

The geometry module (GEOM) passes the viewing space primitive descriptors to a rendering module (DRW) which converts the viewing space primitive descriptions into a form suitable for display, typically by scan conversion into a 2-D array of pixel values in an image buffer memory (IMINT). The rendering module (DRW) may perform calculations for hidden surface removal, using the z coordinates, and for shading. Suitable means for performing such tasks are well known in the art.

In accordance with the multiple rendition technique described by Fuchs et al in the reference cited above, the pixel array in the buffer (IMINT) is an intermediate point of sampled image. For each image appearing on the display device (DIS) a set of N intermediate images are rendered and a module (OFFS) applies for each of the N renderings a different predetermined offset so that the sample point for each pixel moves between renderings. An image accumulator buffer (IMACC) adds together the intermediate images as they are generated so that after N renderings the image accumulator buffer (IMACC) contains an image which has been filtered in accordance with the sample point distribution and any weightings that may be attached to each sample point.

If successive refinements of the image are to be displayed as soon as they are available, as described by Fuchs et al then the values maintained in the buffer (IMACC) should be normalised so as to form a true running average of each rendition. If the buffer (IMACC) is double-buffered, however, the intermediate pixel values can simply be added together and divided by N after all renditions have been performed to obtain the final average, the final average value being read into the output stage of the double buffered image accumulator (IMACC).

In practice the offsets may be used to move the primitives relative to this stationary sample point array. For clarity, however, FIG. 2 illustrates the reverse situation where a primitive P having an edge E and a vertex V remains stationary over a square array of pixel areas A, B, etc., while N equals sixteen different sub-pixel offsets affects point-sampling at points marked with dots within each of the two representative pixel areas A and B.

The sample point arrays shown for pixels A and B are identical and are repeated in every pixel area of the pixel array in accordance with a sub-pixel array defined by the set of N(=16) offsets. It can be seen that the sub-pixel array in FIG. 2 is a simple example of sample points placed at the centres of a square grid of sixteen sub-pixels.

Figure 2:
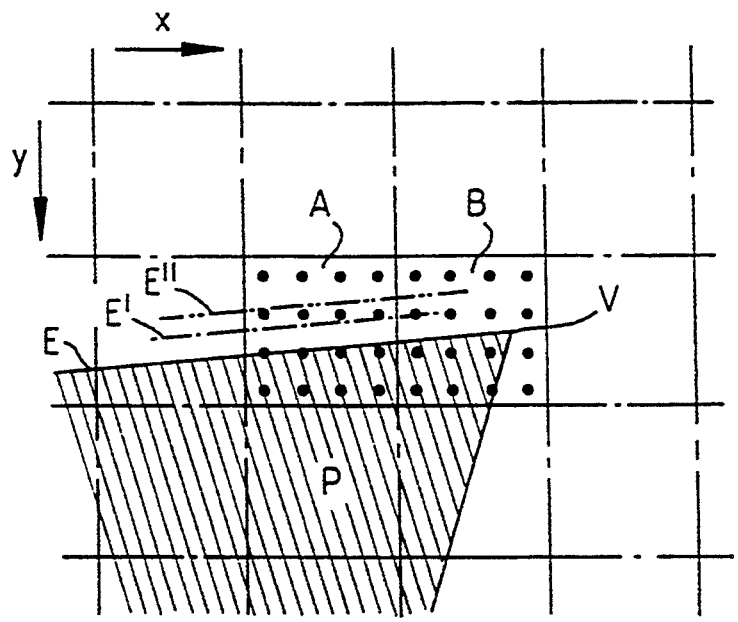

If it is assumed for simplicity that the shaded primitive P has a colour value of 1 and the background has a value of zero, it can be seen from FIG. 2 that the final average value for pixel A will be seven sixteenths or eight sixteenths and that for pixel B will be five sixteenths or six sixteenths. These fractions represent the fraction of the pixel area covered by the primitive quantised in sixteenths of a pixel so that the image in the accumulator buffer (IMACC) is at least approximately anti-alias filtered.

Anti-aliasing is a problem which is more apparent on some features of an image than on others. In particular, an edge such as the edge E, which slopes very slightly with respect to the principle axes x and y of the pixel array, tends to generate very visible staircase effects. This is particularly disturbing in motion picture image sequences when the steps of the staircase appear to run at high speed along the edge E as it moves, for example to positions E' and E'' in successive images.

FIG. 2 shows how the sample grid pattern uses these potential sixteen quantisation levels inefficiently, particularly in the case described when aliasing is generally most obtrusive. As the primitive edge E moves to position E' the filtered colour value remains constant at eight over sixteen. Then in the short space between E' and E'' the value jumps four levels to twelve over sixteen. In effect, as the relevant edge approaches horizontal or vertical, the $N(=16)$ quantisation levels potentially available are effectively reduced to only the $\sqrt{N}(=4)$ so that twelve of the sixteen renditions are effectively made redundant in the situation where good filtering is most needed. Our co-pending UK patent application No. 9014528.5 (PHB33649) discloses a novel series of sampling arrays which use the quantisation levels more efficiently by providing an array of points which are non-regular or which are regular but not aligned with the pixel rows so that projections of the points intersect the pixel axes at more than $\sqrt{N}$ points. The present invention is equally applicable to the prior art regular sub-pixel arrays and to the special sub-pixel arrays disclosed in the above referenced co-pending application.

Figure 3:
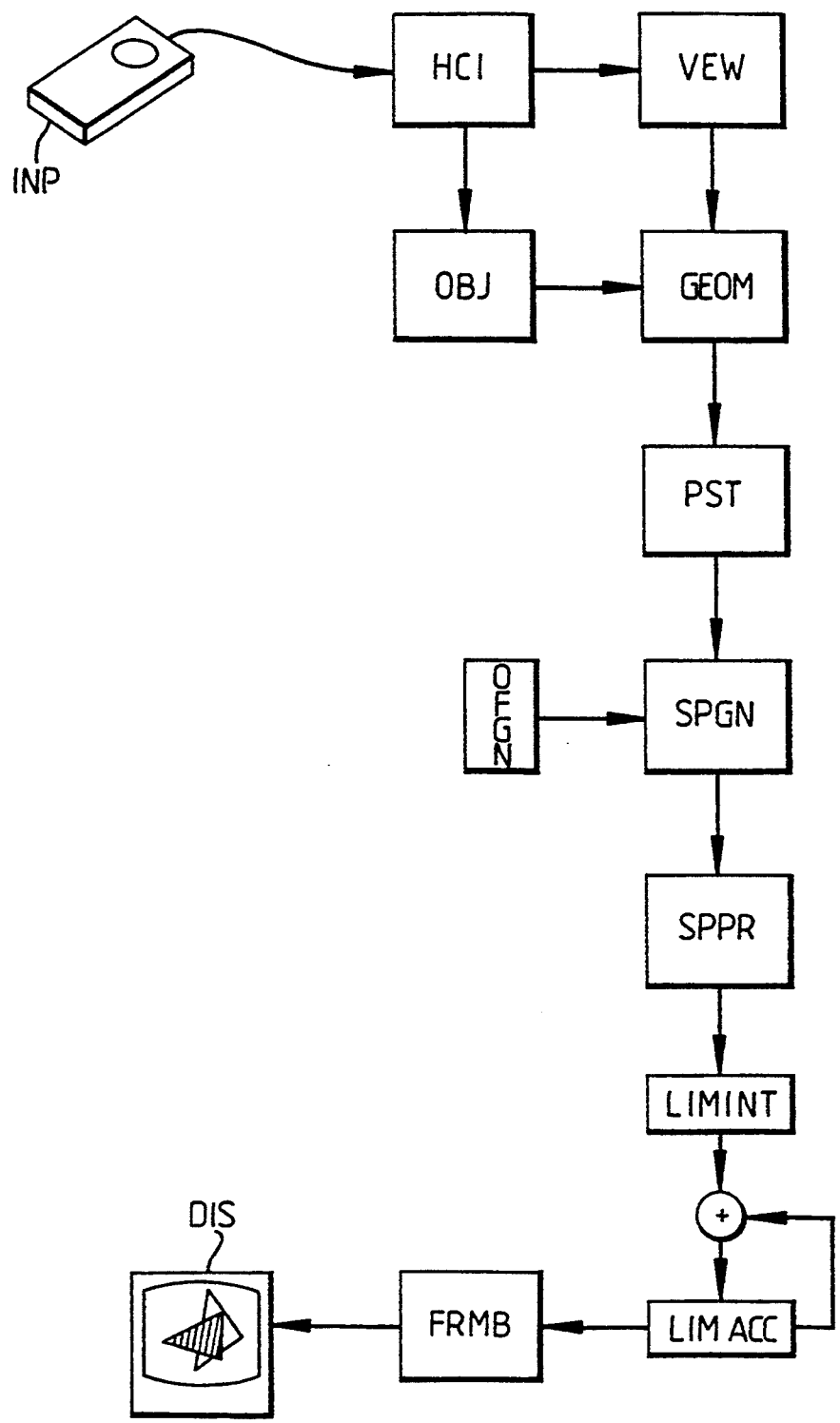

FIG. 3 shows in block schematic form apparatus according to the invention for displaying images representing objects in a three dimensional space on a two dimensional display the images being generated by means of a scan line algorithm and is arranged to enable multiple rendition of the image for anti-alias filtering.

As with the apparatus shown in FIG. 1, a data base module (OBJ) stores and manages a data base forming a model of a three dimensional environment, "the object space", containing various three dimensional objects each modelled as a group of object primitives. Another module (VEW) defines a viewing space, for example in terms of the position of a view point, the direction of view and the field of view. User input means (INP) such as a track ball, mouse and/or keyboard are connected to a human computer interface (HCI) to allow a user to manipulate or modify objects within the object space or to manipulate the view point, direction of view, and other attributes of the viewing space. A geometry module (GEOM) performs geometric transformations to translate the various object space geometric descriptions of primitives defined in the data base module (OBJ) to equivalent descriptions in the viewing space. These descriptions are stored in a primitive store (PST) which could form part of the geometry module (GEOM). A span generator (SPGN) and span processor (SPPR) together with the offset generator (OFGN) are equivalent to the modules (DRW) and (OFFS) of FIG. 1.

The scan line algorithm generates an image one line at a time, typically from top to bottom. While processing a screen line, information about all the primitives, which in the embodiments described are polygons, which contribute to the line must be available. This is achieved by maintaining a linked list, called the active polygon list (APL), of all the contributing polygons. When moving from one screen line to the next some polygons will no longer be contributing to the image, so these must be deleted from the list. Others may now start to contribute and these must be added. The order in which polygons appear in the list is of no consequence. It is only necessary that the list is an exact record of all polygons which partially cover the current line.

Figure 5:
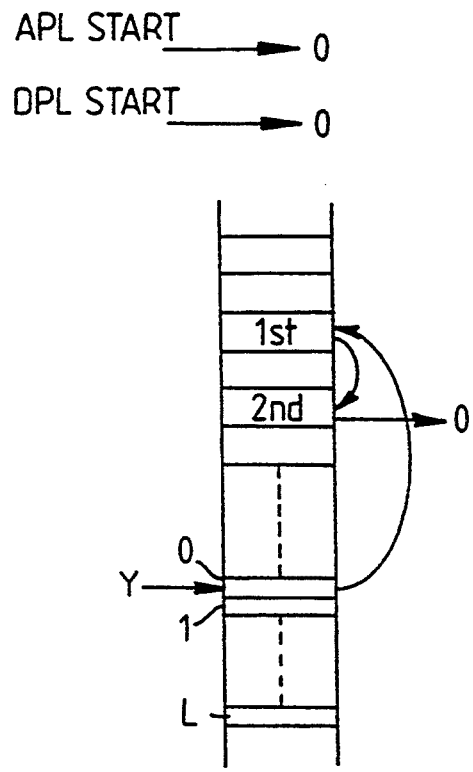

To enable the active polygon list to be constructed a data table of all the two dimensional polygons that are going to make up the image is assembled before any pixels of that image are generated. This contrasts with non scan-line systems, such as that shown in FIG. 1, where polygons may be processed one at a time from the three dimensional representation to two dimensional pixels. If the three dimensional polygons are sorted into buckets, one for each screen line, then the addition of new polygons to the active polygon list (APL) can be done simply by appending the appropriate bucket list onto the APL. FIG. 5 shows this structure which is in the memory PST.

As shown in FIG. 5, there is a memory bank 0,1, ... L which points to a bucket list of polygons which start on scan lines 0,1, ... L. These y-buckets contain a linked list of polygons which start on a given line y. In FIG. 5 it is shown that on line y=0 two polygons start (1st and 2nd). For each polygon the start line (STY) and end line (EDY) are stored together with edge slopes and x values on the start line (which in the case of the triangular primitive shown in FIG. 4 will be a single value). In addition depth values (z) and surface characteristics will be stored.

The basic algorithm for the scan generator (SPGN) to process one frame is as follows:
for each y,
 if new entries in y-bucket
  add new entries to active polygon list
 for each polygon in active polygon list
  generate a span descriptor
  if line=EDY
   delete polygon from active polygon list else
   increment edges.

Thus after all the polygons have been sorted into y-buckets depending on their minimum y value, the span generator (SPGN) traverses the screen from minimum to maximum screen y, i.e. from top to bottom. For each line it transmits a span descriptor (SD), for every polygon present on that line to the span processor (SPPR) which draws the pixels into a single line image buffer (LIMINT) which stores intermediate pixel values. The span generator (SPGN) maintains a list of active polygons which is updated before processing each scan line. Typically, the polygons in the new y-buckets are added to the list and some old ones are deleted. Remaining old polygons have all the edge values incremented by their vertical slopes at this stage.

For any screen line y=L a bucket of linked polygons exists that terminate in a null pointer, that is a pointer which points to address zero. A processor in the span generator (SPGN) maintains the active polygon list. For the current line, it first adds the bucket L to the active polygon list to bring in polygons which start on this line by writing the start address of bucket L into the null pointer of the active polygon list, the null pointer of bucket L then forming the new null pointer of the active polygon list. It then traverses the active polygon list and for each polygon generates a span descriptor (SD) which includes information about the start and finish x values, depth or z-value, colour, lighting values, etc. This span descriptor is sent to a separate span processor (SPPR) which writes pixel values into the line buffer (LIMINT). If required, hidden surface removal may also be performed at this stage, for example, by means of the z-buffer algorithm. The span generator (SPGN) also increments the x-left and x-right values of each polygon descriptor by the appropriate slope value ready for the next screen line.

The amount of memory which must be allocated to the y-bucket polygon list depends on the total number of polygons in the scene and also on the complexity of the data structures. Sophisticated rendering algorithms with multiple texture maps will need much more storage capacity than simple Gouraud shaded polygons. The polygon list supports two different linked structures simultaneously, the y-bucket linked list and the active polygon linked list. However, the same pointer field can be used for both since they are never needed simultaneously.

There is an array in the memory having a size equal to the number of lines in the screen (0,1 ... L) containing entries which point to the y-buckets, that is the linked list of polygons which begin on each line. There is also a pointer, APL start, which points to the first polygon structure in the active polygon list (APL). This structure is used in maintaining the active polygon list (APL) and the only significant field of this structure is link pointer. The contents of the frame polygon memory before processing the first screen line is illustrated in FIG. 5.

Initially the link pointer field of APL start points to null. The y-bucket entry for screen line zero points to a list of two polygons linked by their link pointer fields. The second polygon points to null. New y-buckets are added to the active polygon list at the start of every screen line. If a bucket is empty, the null link pointer of the last polygon will simply be overwritten with the null pointer from the bucket array entry.

According to the anti-alias filtering scheme disclosed by Fuchs et al, all the polygons in a frame are rendered a number of times into a cumulative buffer, each rendition having a different pair of sub-pixel xoffsets and yoffsets. All x and y polygon vertex positions are processed and held to fractional accuracy. The result is a spatial filtering of the image with anti-aliasing effect. The scan line processing by definition happens on a line-by-line basis and although sub-pixel xoffsets can easily be dealt with, the yoffsets can cause one scan line to influence the next. This is not possible with the known scan line algorithm.

Figure 4:
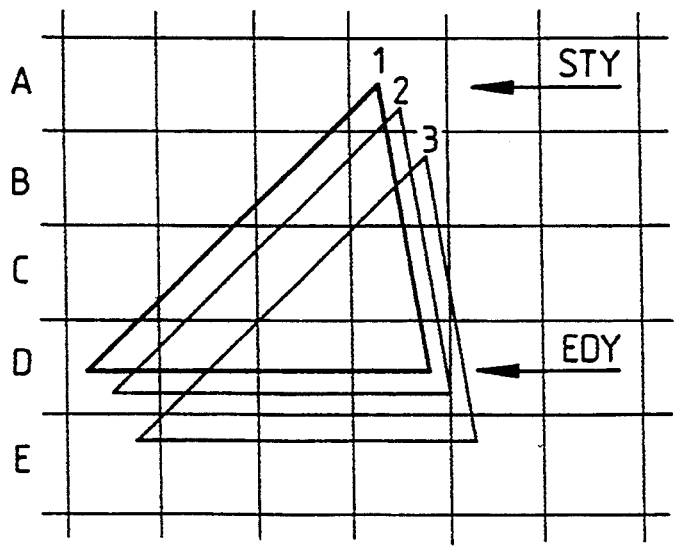

FIG. 4 shows a triangular polygon shown in its normal position 1 and in two possible offset positions 2 and 3. For scan lines A to D, the new limits xleft and xright of the span can be computed for positions 2 and 3 from the offset values Nx and Ny. The Nx value is simply added to both xleft and xright and the Ny value is multiplied by the edge slopes to transform it into a horizontal offset before subtracting; that is xleft (new)=xleft+Nx−Ny δxleft, and xright (new)=xright+nx−ny δxright.

Each span is sent a number of times to the span processor (SPPR) with the xleft and xright values modified in accordance with each offset.

To achieve anti-alias filtering by multiple rendition it is necessary to send each span desciptor a number of times to the span processor (SPPR). For the horizontal (or x) offsets this poses no problems but for the vertical (or y) offsets a number of problems exist. In scan line A the scan can be reduced to zero or even a negative length by these offsets. The polygon strictly ends at line D but when it is offset to position 3 it is necessary to render it in line E also. The first problem may be overcome by detecting a zero or negative span and rejecting it either within or before applying it to the span processor (SPPR). The second problem is solved in this embodiment by keeping a deleted polygon list (DPL) as well as the active polygon list (APL). The deleted polygon list (DPL) is constructed by taking all the polygons deleted in the processing of the previous scan line. It is then erased after the next scan line and the deleted polygons of that next scan line are then stored. Thus the deleted polygon list comprises all those polygons deleted from the active polygon list in the preceding line.

Figure 6:
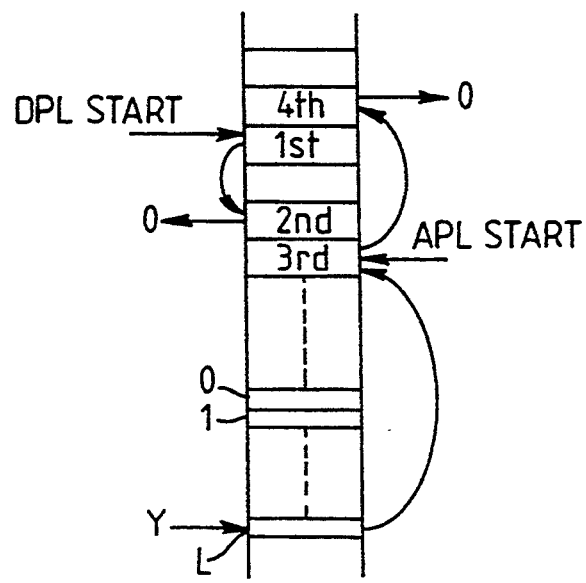

FIG. 6 shows the contents of the frame polygon memory for the processing of screen line L. It shows that the first and second polygons which started on line 0 finished on line L−1 and hence comprise the deleted polygon list DPL for line L. It should be noted that it is not necessary that the polygons start and finish on the same lines, for example if only the first polygon finished on line L−1 the deleted polygon list would contain only the first polygon and it would then output a null pointer instead of being linked to the second polygon. It can also be seen that two further polygons, third and fourth, start on line L and that these are added to the active polygon list APL. In this example these are the only two polygons in the active polygon list but again this is not necessary or even usual as other polygons which started in previous lines may still be present. In that case the third and fourth polygons would merely be added to the list by linking them to the null pointer of the previous y-bucket.

The high level algorithm executed by the span generator (SPGN) when performing anti-alias filtering by multiple rendition is as follows:

```
for each y
  append new y-bucket to active polygon list
  select first offset
  for all renditions except last
    for all polygons in deleted polygon list
      generate span
    for all polygons in active polygon list
      generate span
    accumulate line buffer
    select next offset
  for all polygons in deleted list
    generate span
  erase deleted polygon list
  for all polygons in active list
    if first span of polygon
      fractionally increment polygon to next screen line
    else
      generate span
      increment polygon one screen line
    if last span of polygon
      append polygon to deleted polygon list
  accumulate line buffer
  transfer line accumulator to frame buffer
```

The high level algorithm given above has to be qualified in certain respects to take account of the problems set out with regard to offsets in the y direction. The 'generate span' statements relating to the deleted polygon list are only performed if the vertical offset Ny+(- the fractional part of EDY) 1. This is the required condition to bring a portion of the polygon onto the current scan line.

Where two polygons are vertically adjacent it is necessary to avoid attempting to display them both on the screen line where they meet in an antialiased system in order to avoid errors which are noticeable in an otherwise smooth image. To achieve this in the present embodiment the first line of a polygon is not displayed. This gives the advantage of overcoming the problems that occur in applying the vertical offset to the first span of a polygon which starts at some fractional vertical position. The transformation which converts a vertical offset into a horizontal shift of xleft and xright goes wrong in those cases. That is, when the apex of a triangle is the first line xleft and xright swap over to produce a negative span length. It is, however, still necessary to deal with the case where a vertical offset causes the first span of a polygon to occur on the next display row (or screen line). These spans can be detected and rejected using the following test which will apply on the screen line immediately after STY.

if (integer part of STY)=Y−1 and (fractional part of STY)+Ny 1 then reject span.

This may be combined with the condition of never displaying the first line of a polygon to give the test if integer (STY+Ny) Y then reject span.

Unlike the active polygon list (APL) which gradually evolves as screen lines are processed, the deleted polygon list (DPL) is erased and rebuilt for each screen line. However, since no polygon can be present in both the active and deleted lists simultaneously, the same link pointer can be used in the polygon descriptor for both purposes.

In addition to generating spans from polygons, it is also necessary vertically to increment all the parameters of the polygons for each screen line. This may be done at the same time as the final rendition for each line is generated. The first n−1 renditions then involve simply generating spans for the current active (APL) and deleted (DPL) polygon lists. Each rendition is performed and stored in a line buffer (LIMINT) which is then added into a line accumulator (LIMACC). The final rendition involves first generating spans from the deleted polygon list (DPL) and then erasing the deleted polygon list (DPL) in preparation for its re-construction. The active polygon list (APL) is then processed, that is spans are generated and completed polygons are moved from the active polygon list (APL) to the new deleted polygon list (DPL). Finally, the line accumulater buffer (LIMACC) accumulated and the resulting anti-alias filtered image line is transferred from the line accumulator (LIMACC) to the frame buffer.

Another detail in the processing of the polygons which should be taken into account is that when vertically incrementing the xleft, xright, zleft etc. parameters, the correct values at integer pixel positions are wanted. Since the STY value of a polygon has a fractional part, the first vertical increment is used to synchronise the polygon to the integer y grid, that is it is incremented not by a whole screen line, but by 1- (the fractional part of a STY).

Figure 7:
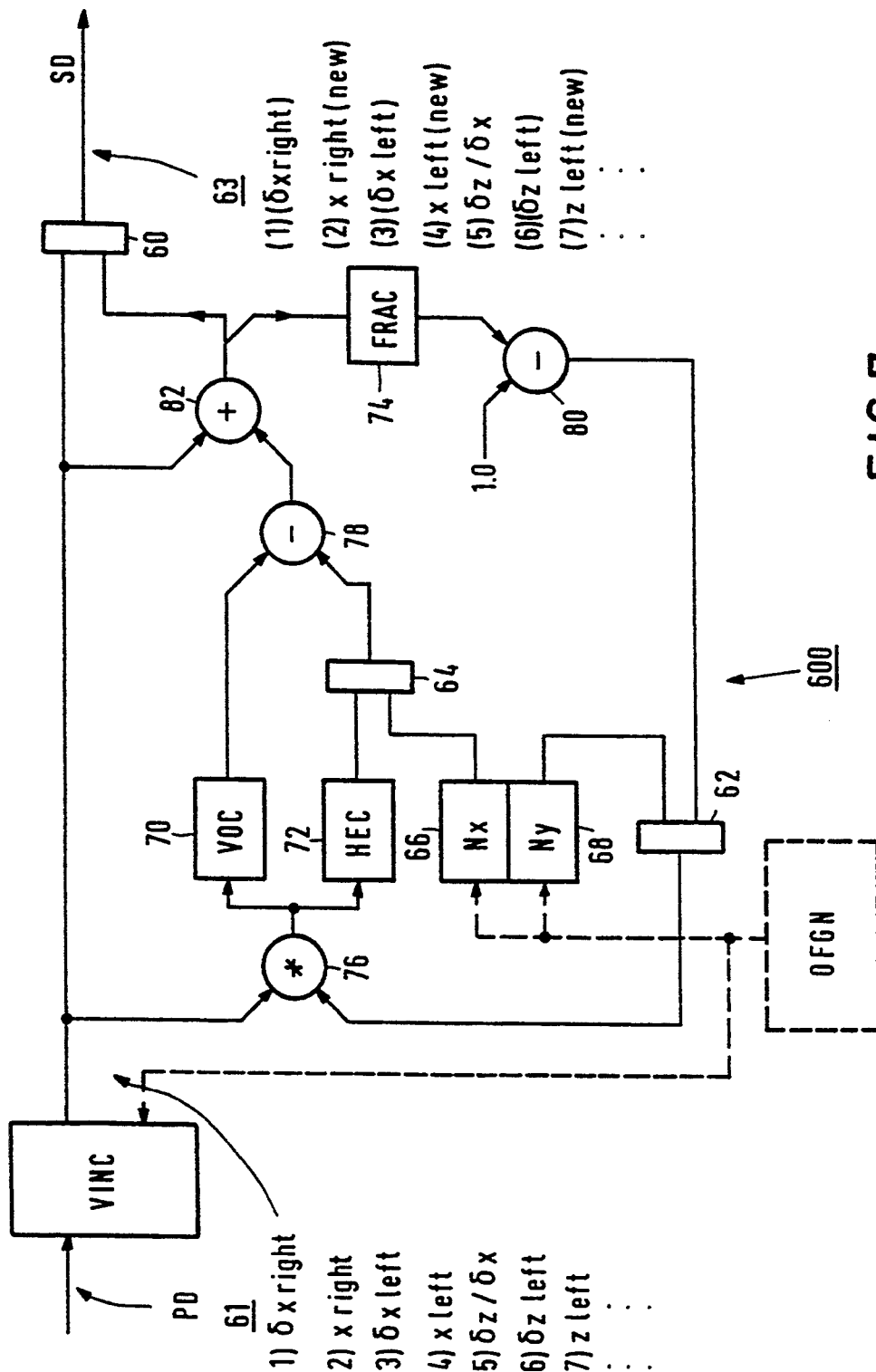

FIG. 7 shows in more detail the span generator SPGN of FIG. 3, which receives primitive descriptors PD from the primitive store PST (FIG. 3) and supplies span descriptors SD to the span processor SPPR, as described above. The span generator SPGN is also connected to the offset generator OFFGN, shown dotted in FIG. 7.

The span generator SPGN includes a vertical incrementing circuit VINC and an offset and correction circuit 600. The circuit 600 includes three 2-to-1 multiplexers, 60, 62 and 64, five temporary storage registers 66, 68, 70, 72 and 74, a multiplier circuit 76, two subtracting circuits 78 and 80 and an adding circuit 82. Not shown but implicit to the skilled reader are sequencing and control circuitry for supplying selection signals to the multiplexers, clock signals to the registers and so forth.

Each primitive descriptor PD supplied to the vertical incrementer VINC includes: the start row STY and end row EDY values; starting values for the xleft and xright (the left and right edge positions of the primitive); and the slopes δxleft and δxright of these edges with respect to y (vertical position coordinate). The primitive descriptor also includes a start value for zleft, this being the value of a depth coordinate z at the left edge of the primitive. Partial derivatives δzleft (with respect to y) and δz/δx are also included. In a practical embodiment, yet more parameters could be included in the descriptor PD, most notably mapping coordinates u and v (with partial derivatives in x and y), but also including parameters such as lighting values or surface normal values that can be used for shading effects.

With regard to a given primitive, the vertical incrementer VINC steps through the rows from STY to EDY using the edge slopes and partial derivatives with respect to y to update the start and end positions xleft and xright for the current span, and supplies to the circuit 600 the values xleft, xright, zleft, δz/δx, which are required to form the span descriptors SD for the span processor SPPR (FIG. 3). To facilitate the addition of offsets Nx,Ny, and further to allow for vertical offset correction and horizontal edge correction of zleft to be included in the span descriptors SD, the values δxleft, δxright and δzleft are also supplied. To reduce the number of connections in the circuit, these values are supplied sequentially, in the order listed at 61 in the figure.

To include the sub-pixel offsets Nx,Ny and the corrections, the multiplexer 60 is switched to connect the output of adder 82 to the span processor SPPR so that the latter receives a sequence of modified values xleft(new), xright(new) and so forth, as listed at 63 in FIG. 7. The formulae for and generation of these modified values by the offset and correction circuit 600 will now be described.

As mentioned above, the equations defining xleft(new) and xright(new) are as follows:

$$xleft(new) = xleft + Nx - Ny.\delta xleft, \text{ and}$$

$$xright(new) = xright + Nx - Ny.\delta xright.$$

Registers 66 and 68 provide storage for the horizontal and vertical offset values Nx and Ny respectively, received from, the offset generator OFGN. The terms Ny.δxleft and Ny.δxright are vertical offset correction (VOC) terms, and register 70 provides temporary storage for one VOC term at a given time.

The values xleft(new) will be generated to high (sub-pixel) precision, but any fractional (sub-pixel) part of xleft(new) will be ignored by the horizontal incrementers in the span processor SPPR. This truncation to integer x values causes a problem when there is some other parameter, such as z, u or v to be interpolated across the primitive. The value of, say, z computed for the start position of a row is correct for the high precision value of xleft, but not for the truncated value. This error in z can cause ragged intersections between primitives, and spurious "poke-throughs" of supposedly hidden surfaces. Similar truncation errors in texture coordinates u,v can cause small but visually obtrusive discontinuities in the mapping of a texture pattern.

Fortunately, a horizontal edge correction value HEC(z) can be calculated and added to zleft, in accordance with the formula:

$$HEC(z) = (1-frac(xleft(new))).\delta z/\delta x,$$

where frac(xleft(new)) is the fractional (sub-pixel) part of the modified horizontal start position xleft(new). The fractional part of a value may typically comprise the four least significant bits out of a total of 16–32 bits, depending on the size of the pixel array and the sub-pixel precision required. Including a vertical offset correction value Ny.δzleft, the correct formula for zleft(new) becomes:

$$zleft(new) = zleft + (1-frac(xleft(new))).\delta z/\delta x - Ny.\delta zleft.$$

It will be seen that this formula is similar in form to that for xleft(new) given above, with the horizontal edge correction term HEC(z) in place of Nx. Furthermore, the required fractional part of xleft(new) is or can be generated at the same time as the integer part of xleft(new), which is already required by the span processor.

The span generator in FIG. 7 takes advantage of this similarity and the availability of frac(xleft(new)) to perform the correction of zleft using substantially the same circuitry as is used to generate xleft(new) and xright(new). This is achieved by synchronizing the operation of the multiplexers 60–64 and storage registers 70–74 with the sequential availability of seven values at the output of the vertical incrementer VINC. These seven stages of operation may be numbered (1) to (7), and will be described in order below. The sequence of values presented by the incrementer VINC in these stages is shown at 61 in FIG. 7, the sequence of values presented to the span processor is shown at 63 in the FIG. 7. The values presented in cycles 2,4,5 and 7 form the span descriptor SD, while the values in parenthesis (cycles 1, 3 and 6) are superfluous and ignored by the span processor. The operations in each stage (1) to (7) are as follows:

(1) Offset Ny, received from register 68 via multiplexer 62, and δxright, received from incrementer VINC, are applied to the multiplier 76, whose output thus carries VOC(xright) which is stored in the register 70;

(2) VOC(xright), stored in register 70, is subtracted at 78 from horizontal offset Nx, received from register 66 via multiplexer 64, and the difference is added at 82 to the basic xright value received from the vertical incrementer VINC; the output of adder 82 thus carries the corrected xright(new) which is forwarded, at least in its integer part, via multiplexer 60 to the span processor as a first part of the span descriptor SD;

(3) δxleft is received from the incrementer VINC, VOC(xleft) = Ny.δxleft is stored in register 70;

(4) xleft is received from the incrementer VINC, xleft(new) is generated by adder 82 and forwarded to the span processor SPPR; at the same time, the fractional part of xleft(new), frac(xleft(new)), is stored in resistor 74;

(5) frac(xleft(new)) is subtracted from 1 at 80, and supplied via multiplexer 62 to the multiplier 76; the multiplier 76 receives $\delta z/\delta x$ from the incrementer VINC and generates the horizontal edge correction value for z, HEC(z)=(1-frac(xleft(new))).$\delta z/\delta x$, which is stored in register 72; $\delta z/\delta x$ is forwarded by multiplexer 60 to the span processor;

(6) Ny and $\delta z$left are multiplied at 76 to form the vertical offset correction value for z, VOC(z), which is stored in register 70;

(7) zleft(new) is generated by subtracting VOC(z) from HEC(z) and adding the basic value zleft received from the incrementer VINC to generate zleft(new), which is supplied to the span processor SPPR (FIG. 3) via multiplexer 60.

For so long as frac(xleft(new)) remains in register 74, horizontal edge correction and vertical offset correction can be applied to any number of further parameters (u,v,surface normal and so on) by repetition of the cycles (5),(6),(7) with appropriate values being supplied by the incrementer VINC. It will be seen that only the elements 72,74,62, and 64 and some additional sequencing have been necessitated by the desire for horizontal edge correction, the other elements (in particular the multiplier 76) being already present for vertical offset correction of xleft and xright. Moreover, since one of the factors applied to multiplier 76 is always a fraction, having perhaps only four or five bits, there is no need for a general purpose multiplier for two high-precision numbers of 16–32 bits each.

It will be appreciated by those skilled in the art that many other circuits and operating sequences are possible that will still perform the required calculations.

From reading the present disclosure, yet other variations will be apparent to persons skilled in the art. Such variations may involve other features which are already known in the design, manufacture and use of electronic graphics systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. Apparatus for generating an image of objects in a three dimensional space for display on a two dimensional regular pixel array comprising a series of pixel rows, the apparatus comprising:
   rendering means for generating and storing a plurality of primitives representing surfaces to form, for a first one of the pixel rows and then sequentially for a series of new pixel rows in turn, a plurality of renditions of one-dimensional intermediate pixel arrays which contain pixel values at sample points having an offset with respect to said primitives,
   means for identifying a subset of the primitives as being potentially active for each new row in the series,
   means for imposing for each such rendition a different predetermined offset between the primitives and sample points, the different offsets for the plurality of renditions corresponding to an oversampling pattern,
   means for identifying a further subset of the primitives as being potentially active in the new row depending on the said offset, and
   means for combining the plurality of intermediate pixel arrays, for a first one of the pixel rows and then sequentially for the series of new pixel rows in turn, to generate and store a filtered pixel array representing an image which has been oversampled and filtered.

2. Apparatus as claimed in claim 1, further comprising means for generating and storing start row data identifying for each primitive the first pixel row in the series for which the primitive is active and means for maintaining a list of active primitives and updating the list by using the start row data to identify and add to the list any primitives first active in each new pixel row.

3. Apparatus as claimed in claim 2, wherein the start row data comprises a list identifying for each pixel row any primitives first active in that row.

4. Apparatus as claimed in claim 1 comprising means for generating and storing end row data identifying for each primitive the last pixel row in the series for which the primitive is active and means for maintaining a list of active primitives and updating the list by using the end row data to delete. a primitive from the active primitive list when the plurality of intermediate pixel arrays for the identified last row have been rendered.

5. Apparatus as claimed in claim 4, comprising means for maintaining a deleted primitive list identifying primitives deleted from the active primitive list which may yet be required to be treated as active in response to one or more of said offsets.

6. Apparatus as claimed in claim 4 wherein each primitive descriptor includes a pointer field for a pointer for a further primitive descriptor and wherein the active primitive list is formed for each row by using a succession of such pointers to link the active primitives together in a chain.

7. Apparatus as claimed in claim 6 wherein the same pointer field is used as part of the start row data field to link together in a chain two or more primitives which are first active in the same row.

8. Apparatus as claimed in claim 6, wherein the same pointer field is used to link together in a chain the further subset of primitives.

9. An apparatus as claimed in any preceding claim 1, the rendering means including span generating means for receiving a primitive descriptor and for generating therefrom a sequence of span descriptors each defining the extent of a primitive on a corresponding pixel row, wherein the span generating means includes:
   means for calculating with sub-pixel precision a horizontal start position for the span;
   means for calculating a start value for at least one further parameter;
   means for receiving with sub-pixel precision a vertical offset value, for calculating therefrom a vertical offset correction for the horizontal start position and for modifying the horizontal start position in accordance with the vertical offset correction;

means for calculating for the further parameter start value (i) a correction due to the received vertical offset and (ii) a correction due to the sub-pixel part of the modified horizontal start position to compensate for truncation of the horizontal start position to an integer pixel position, and for modifying the further parameter start value in accordance with those corrections.

10. An apparatus as claimed in claim 9 wherein the horizontal start position for the span is modified before modification of the further parameter start value(s), the fractional part of the modified horizontal start position being stored temporarily for use in calculating the correction(s) to be applied to the further parameter start value(s).

11. An apparatus as claimed in claim 9 wherein a horizontal end position for the span is calculated and modified before modifying either the horizontal start position or any further parameter start value.

12. An apparatus as claimed in claim 9 wherein the means for calculating the corrections for the horizontal start position and the further parameter start value comprise an arithmetic circuit adapted to receive the horizontal start position and further parameter start value in a predetermined sequence, interleaved with respective derivatives of those values for use in the calculation of the corrections.

13. An apparatus as claimed in claim 12 wherein the arithmetic circuit includes a multiplier which is used in turn to calculate corrections for both the horizontal start position and the further parameter start value.

* * * * *